United States Patent
Oooka et al.

(10) Patent No.: US 7,423,865 B2
(45) Date of Patent: Sep. 9, 2008

(54) DISPLAY DEVICE AND APPARATUS

(75) Inventors: Hiroshi Oooka, Mobara (JP);
Masamitsu Furuie, Mobara (JP);
Hirotsugu Sakamoto, Chiba (JP)

(73) Assignee: Hitachi Displays Ltd., Chiba-ken (JP)

( * ) Notice: Subject to any disclaimer, the term of this patent is extended or adjusted under 35 U.S.C. 154(b) by 412 days.

(21) Appl. No.: 11/169,799

(22) Filed: Jun. 30, 2005

(65) Prior Publication Data
US 2006/0002064 A1 Jan. 5, 2006

(30) Foreign Application Priority Data
Jul. 1, 2004 (JP) .............................. 2004-195217

(51) Int. Cl.
*H05K 5/00* (2006.01)
*H05K 7/00* (2006.01)
*G02F 1/1333* (2006.01)

(52) U.S. Cl. ........................... 361/681; 349/58; 349/60

(58) Field of Classification Search ................. 361/681, 361/683; 349/56, 58, 59, 60; 313/513
See application file for complete search history.

(56) References Cited

U.S. PATENT DOCUMENTS

| 5,375,005 | A | * | 12/1994 | Komano | ........................ 349/58 |
| 5,838,400 | A | * | 11/1998 | Ueda et al. | ..................... 349/58 |
| 5,838,412 | A | * | 11/1998 | Ueda et al. | ................... 349/150 |
| 6,330,150 | B1 | * | 12/2001 | Kim | ............................ 361/683 |
| 6,388,722 | B1 | * | 5/2002 | Yoshii et al. | ................... 349/62 |
| 6,532,152 | B1 | * | 3/2003 | White et al. | .................. 361/692 |
| 6,870,582 | B2 | * | 3/2005 | Hayashimoto et al. | ......... 349/58 |
| 2004/0041748 | A1 | * | 3/2004 | Tanaka et al. | .................. 345/30 |
| 2004/0100187 | A1 | * | 5/2004 | Ishida | ......................... 313/504 |
| 2004/0263716 | A1 | * | 12/2004 | Lee et al. | ....................... 349/61 |
| 2005/0088079 | A1 | * | 4/2005 | Daniels | ....................... 313/504 |

FOREIGN PATENT DOCUMENTS

| JP | 10-133816 | 10/1996 |
| JP | 2000-046974 | 7/1998 |

* cited by examiner

*Primary Examiner*—Lisa Lea-Edmonds
*Assistant Examiner*—Anthony M Haughton
(74) *Attorney, Agent, or Firm*—Reed Smith LLP; Stanley P. Fisher, Esq.; Juan Carlos A. Marquez, Esq.

(57) ABSTRACT

The present invention provides a display device which can realize the positioning with high accuracy in mounting a display panel to a casing. Further, the present invention provides a display device which can simplify the mounting structure of a display panel and can mount and fix the display panel to a casing easily and with high accuracy. A pair of mounting holes are formed in both ends of a peripheral portion along one side of an OLED panel which performs an image display. By allowing fixing members to pass through the pair of mounting holes, the OLED panel per se becomes the mounting reference and is positioned with respect to the casing with high accuracy. Further, by forming notched portions on another side of the OLED panel which faces one side of the OLED panel in an opposed manner, the OLED panel is supported on a plurality of points and hence, the OLED panel is positioned and fixed with high accuracy.

4 Claims, 4 Drawing Sheets

DISPLAY DEVICE AND APPARATUS

CROSS-REFERENCES TO RELATED APPLICATIONS

The disclosure of Japanese Patent Application JP2004-195217A filed on Jul. 1, 2004 including the specification, drawings and abstract is incorporated herein by reference in its entirety.

BACKGROUND OF THE INVENTION

1. Field of the Invention

The present invention relates to a display device and a display apparatus, and more particularly to the mounting structure which fixedly mounts a display panel or a display device on a casing of the display device, for example, a casing of a display apparatus such as a television apparatus or a monitor apparatus in a state that the display panel or the display device is aligned with the casing of the display apparatus.

2. Description of the Related Art

As a display apparatus such as a monitor apparatus for information processing terminal, a television receiver or the like, a LCD (liquid crystal display) has been popularly used. This type of LCD device visualizes an image by projecting light on an electron image which is formed on the LCD panel. Although there has been known the structure which makes use of an ambient light as a light source for visualization with respect to a miniaturized information processing terminal, to observe a favorable image on a relatively large screen irrespective of a state of the ambient light, there has been adopted the structure in which a backlight unit is mounted on a back surface side of the LCD panel and an illumination light from the backlight unit is irradiated to an electronic image formed on the LCD panel.

The LCD (Liquid Crystal Display) device which is used as the display apparatus exhibits the extremely speedy progress. Particularly, the miniaturization, the reduction of thickness and the power saving of the LCD device which are requested along with demands for large-sizing of a screen and the reduction of thickness of the display apparatus are indispensable for the further development of sales market.

Such a LCD device is, in general, configured such that a pair of polarizers are mounted on a light incident side and a light irradiation side of the LCD panel which sandwiches a liquid crystal layer between a pair of light transmitting glass substrates, wherein by modulating a polarized state of linearly polarized light incident on the LCD panel using a liquid crystal layer, an electronic image is displayed as a visualized image. Further, among various display devices, a transmission-type LCD device has been forming a main stream, wherein since the transmission-type LCD device requires the illumination from the back surface side of the LCD panel, a backlight unit forms an indispensable constitutional element.

Further, an OLED (organic electroluminescence display) device which is used as a display apparatus, different from the liquid crystal display device which requires the backlight unit, uses a self-luminous light and hence, the OLED possesses features such as the further reduction of a thickness thereof compared to a thickness of the LCD device and an excellent motion picture display attributed to a wide viewing angle and a rapid response speed. Accordingly, recently, the research and development of the OLED are remarkable and various products which reflect the results of such research and development have been positively proposed in a market.

The OLED device or the display device which exhibits the thin thickness as represented by the OLED device is mounted and fixed in the inside of a casing of a television apparatus or the like, for example, together with a drive circuit device and the like thus constituting a display apparatus.

FIG. 7 is a view for explaining the mounting structure in which the OLED device is mounted on and fixed to a casing of a television receiver or the like as the display device, wherein FIG. 7A is a plan view of an essential part as viewed from a back surface side, and FIG. 7B is a cross-sectional view taken along a line B-B' in FIG. 7A. As shown in FIG. 7A and FIG. 7B, in mounting and fixing the OLED device PNO in the inside of the casing CBN, an effective display region (a region in which an image is displayed) of the OLED device PNO is aligned with a back surface of an opening window WND which is formed in the casing CBN, and the OLED device PNO is mounted on the casing CBN by allowing both end portions on an upper side and a lower side of the opening window WND to support the OLED device PNO using mounting hooks FOK.

Here, in this type of mounting structure, for example, there has been disclosed a technique which forms a notched portion in a portion of an OLED device and mounts an electronic device in the notched portion in Japanese Patent Laid-open 1998-133816 (patent literature 1). Further, a technique which forms through holes in an OLED device and positions the OLED device by fitting projecting portions of a shield plate into the through holes is disclosed in Japanese Patent Laid-open 2000-046974 (patent literature 2).

SUMMARY OF THE INVENTION

However, the structure for mounting the OLED device PNO on the casing CBN having the above-mentioned constitution adopts the mounting structure in which the positioning reference of the OLED device PNO with respect to the opening window WND of the casing CBN uses a profile of the OLED device PNO as the reference and hence, there arises an error in the mounting position attributed to the cutting accuracy of the OLED device PNO thus giving rise to a drawback that it is difficult to perform the positioning with high accuracy due to the cutting accuracy of the display device PNL.

Further, in the LCD device which has the similar mounting structure, as the structure which mounts a backlight unit for irradiating an illumination light on a back surface of the LCD device, the mounting structure of the backlight unit on a casing which uses the backlight as the reference is adopted. In such a structure, however, several forming steps for mounting are applied to the backlight unit and hence, there has been a drawback that it is difficult for the display apparatus to narrow a picture frame. Further, an extra mechanism is necessary for mounting the LCD device on the backlight unit and hence, there has been a drawback that the constitutional members and the assembling steps thereof become complicated thus pushing up a manufacturing cost.

Further, the LCD apparatus also uses a profile of the LCD device as the reference for positioning the LCD device with respect to the casing and hence, there arises a drawback that the positioning of the LCD device with high accuracy is difficult due to the irregularities of the profile size. Further, there has been also a drawback that an error in the mounting accuracy between an LCD panel and the backlight unit influences the mounting accuracy between the LCD device and the casing.

Accordingly, it is on object of the present invention to provide a display device which can realize the mounting accuracy in mounting the display device on a casing of a display apparatus with high accuracy.

It is another object of the present invention to provide a display device which can realize the mounting accuracy in mounting a display panel on a casing of a display device with high accuracy.

Further, it is another object of the present invention to provide a display apparatus which can simplify a structure for mounting a display device on a casing of a display apparatus and can mount and fix the display device to the casing simply, easily and with high accuracy.

To achieve such objects, in the display device according to the present invention, a pair of mounting holes are formed in both ends of a peripheral portion along one side of the display device, and fixing members are allowed to pass through the pair of mounting holes and hence, the display device is positioned and arranged with respect to a casing using the display device per se as the mounting reference whereby it is possible to overcome the drawbacks of the related art.

Further, in another display device according to the present invention, at least one notched portion which supports the display device is preferably formed on another side which is arranged to face one side of the above-mentioned display device in an opposed manner and hence, the display device is positioned and arranged in a state that the display device is supported at a plurality of points whereby it is possible to overcome the drawbacks of the related art.

Here, the present invention is not limited to the above-mentioned constitution and various modifications are conceivable without departing from the technical concept of the present invention.

According to the display device of the present invention, the reference point for mounting the casing resides in the display panel per se and hence, it is possible to obtain the extremely excellent advantageous effects including the remarkable enhancement of the mounting accuracy of the display panel.

Further, according to the display apparatus of the present invention, the mounting reference point of the display device resides in the display device per se and hence, it is unnecessary to constitute the new structure for mounting the display device whereby it is possible to obtain the extremely excellent advantages including the realization of the simplification and the reduction of cost of the mounting structure.

BRIEF DESCRIPTION OF THE DRAWINGS

FIG. 3A and FIG. 3B are views specifically showing the mounting structure which mounts and fixes the OLED device to the casing, wherein FIG. 3A is a plan view and FIG. 3B is a cross-sectional view taken along a line B-B' in FIG. 3A;

FIG. 5A and FIG. 5B are views for explaining another example of the structure of mounting the OLED device on other fixing member, wherein FIG. 5A is a plan view and FIG. 5B is a cross-sectional view taken along a line B-B' in FIG. 5A;

FIG. 7A and FIG. 7B are views for explaining the conventional mounting structure for mounting and fixing the display device to the casing, wherein FIG. 7A is a plan view and FIG. 7B is a cross-sectional view taken along a line B-B' in FIG. 7A.

DETAILED DESCRIPTION OF THE INVENTION

Hereinafter, specific embodiments of a display device according to the present invention are explained in conjunction with attached drawings which show the embodiments.

Embodiment 1

Figure 1:
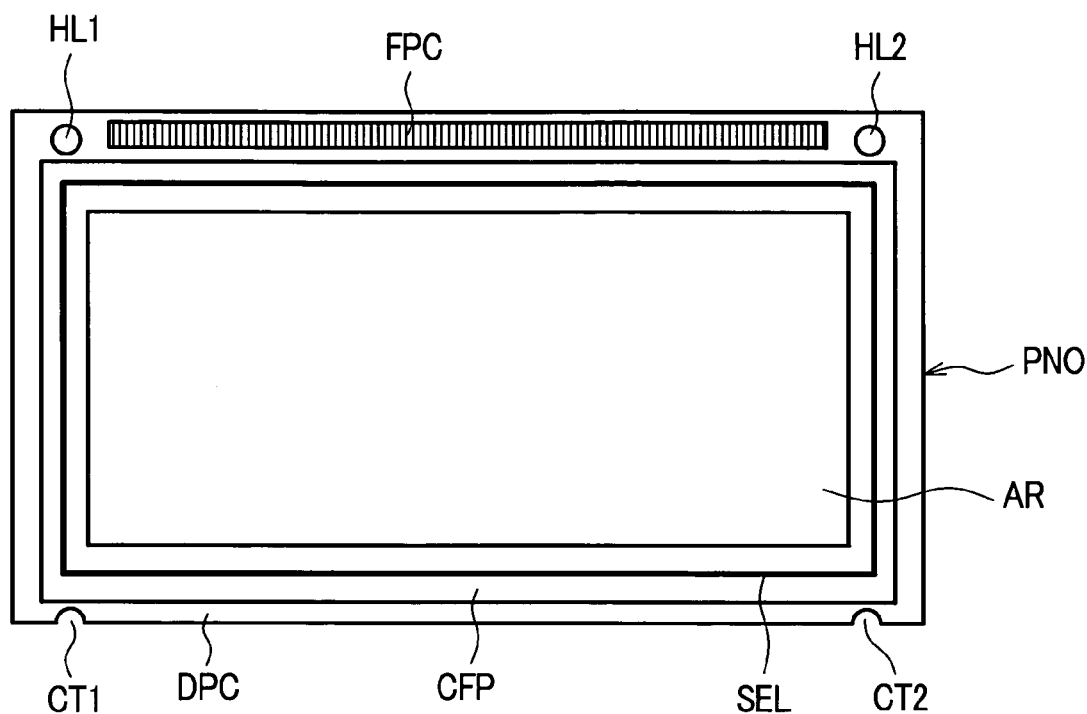
FIG. 1 is a view showing an OLED device.

FIG. 1 is a plan view of an essential part for explaining the constitution of an OLED device according to the present invention. In FIG. 1, reference symbol PNO indicates an OLED panel which constitutes, for example, the OLED device as a display device. The OLED panel PNO is constituted such that a space defined between both substrates, that is, a device substrate DPC which forms active elements such as thin film transistors (TFT) and a white organic EL layer thereon and further forms a flexible printed wiring compression-bonding part FPC and the like on an upper end thereof and a color converting filter transparent substrate CFP is sealed using a sealing material SEL in a high purity dry nitrogen atmosphere where the moisture is reduced to an ultra minute quantity, and a dry nitrogen gas is filled in the inside of the sealed space, wherein an effective display region AR formed on a front surface side of the color converting filter transparent substrate CFP constitutes an image display part which displays an image. Here, a light transmitting glass substrate, a plastic substrate or the like is used as the device substrate DPC and the color converting filter transparent substrate CFP.

Further, mounting holes HL1, HL2 having a given size which constitute reference holes in fixing and mounting the OLED panel PNO to a casing not shown in the drawing are formed at a given interval on both end portions of the flexible printed wiring compression-bonding part FPC which are formed on an upside of the device substrate DPC. The pair of mounting holes HL1, HL2 can be easily formed using any forming means such as an etching method, a sand blasting method, a thermal melting processing method with laser irradiation, a polishing method or the like. Further, since the both end portion of sides of the flexible printed wiring compression-bonding part FPC are sparse regions where wiring and an image forming region and the like are not present, the opening forming operation can be extremely easily performed without changing a size of the organic EL display panel NPO per se.

Further, in both end portions at a lower end of the device substrate DPC which faces the flexible printed wiring compression-bonding portion FPC, a pair of half-moon notched portions CT1, CT2 having a given size which are supported on the casing not shown in the drawing are formed at a given interval. Here, the pair of notched portions CT1, CT2 can be, in the same manner as the above-mentioned forming of the mounting holes HL1, HL2, easily formed using any forming means such as an etching method, a sand blasting method, a thermal melting processing method with laser irradiation, a polishing method or the like, for example.

Further, also on the lower end portion side of the flexible printed wiring compression-bonding portion FPC, there exists a sparse region where the wiring, the pixel forming region and the like are not present. Accordingly, it is possible to extremely easily form the notched portions CT1, CT2 using the opening forming method substantially equal to the above-mentioned method without changing the size of the OLED panel NPO per se. Here, when the pair of mounting holes HL1, HL2 and the pair of notched portions CT1, CT2 are formed using the same forming method, the mounting holes HL1, HL2 and the notched portions Ct1, CT2 can be easily manufactured using the same step.

Here, since the OLED device does not use constitutional members such as a backlight device and a light guide body which are mounted on an LCD device, it is possible to directly apply forming processing for positioning of the OLED panel PNO to the body.

Figure 2:
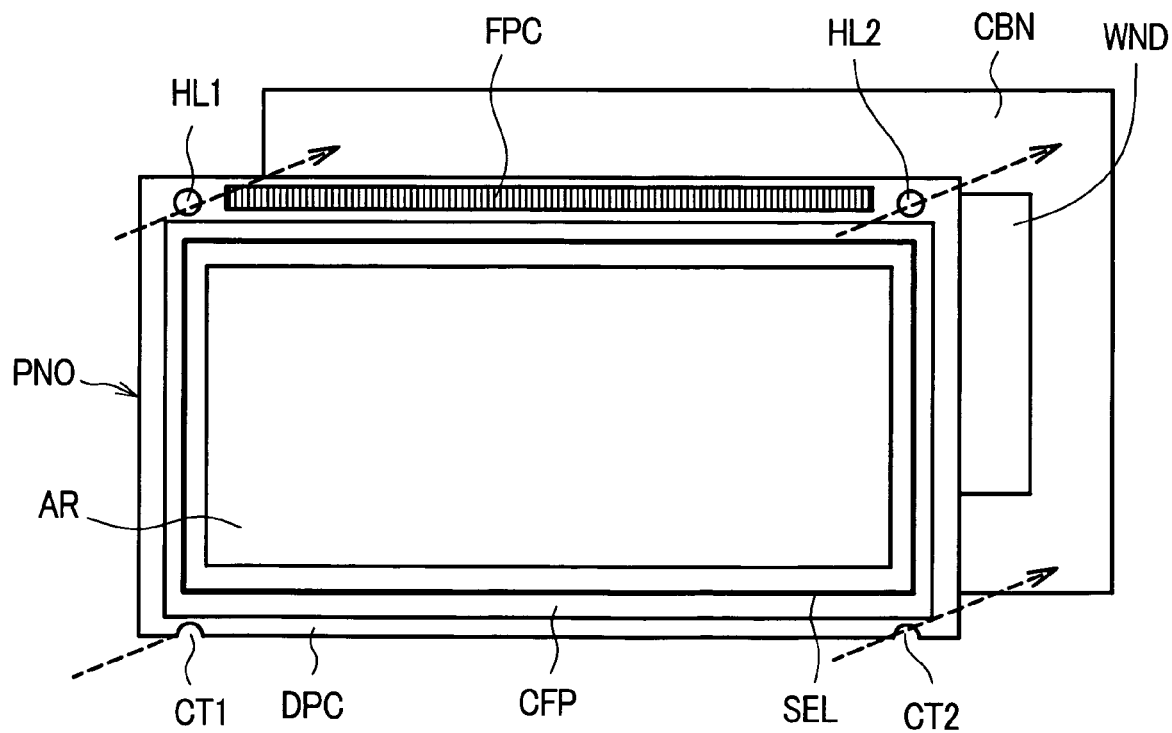
FIG. 2 is a perspective view of an essential part showing the mounting structure for mounting the OLED device on a casing.

In mounting the OLED panel PNO having such a constitution on the casing CBN, as shown in FIG. 2 which is a perspective view of an essential part, it is possible to directly mount the OLED panel PNO in the direction indicated by an arrow with respect to the casing CBN on which the OLED panel PNO is mounted using the pair of mounting holes HL1, HL2 as the reference and hence, the OLED panel PNO can be positioned and fixed with high accuracy irrelevant to the cutting accuracy of the OLED panel PNO. Further, it is unnecessary to provide the new mounting structure for mounting the OLED panel PNO and hence, the simplification of the structure and the reduction of cost can be realized.

Further, by forming the pair of notched portions CT1, CT2 on the lower end portion of the OLED panel PNO, with the use of the notched portions CT1, CT2 as the mounting reference in mounting the OLED panel PNO on the casing, the mounting references are arranged at a plurality of points and hence, the mounting accuracy of the OLED panel PNO can be further enhanced.

Figure 3A:
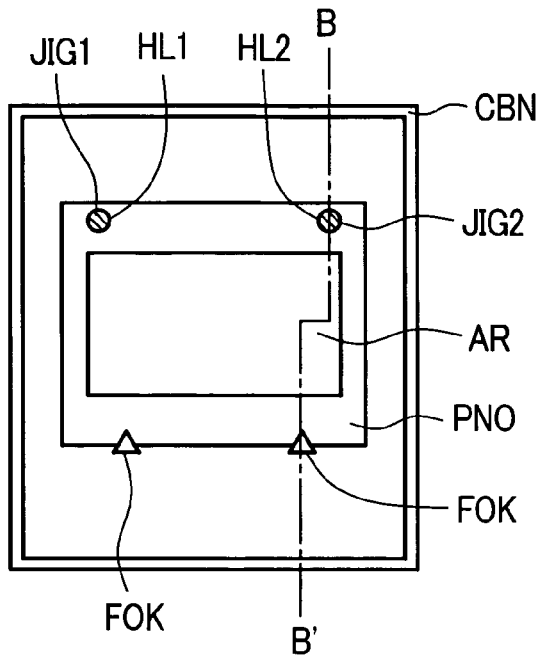
Figure 3B:
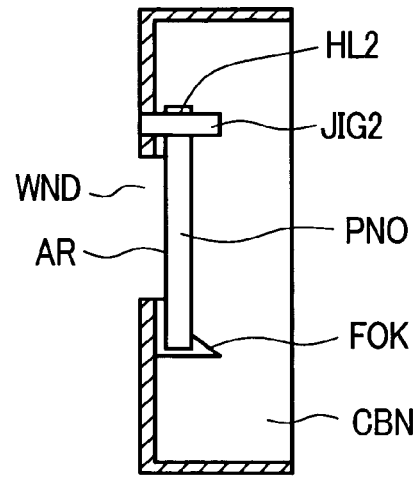
Figure 6:
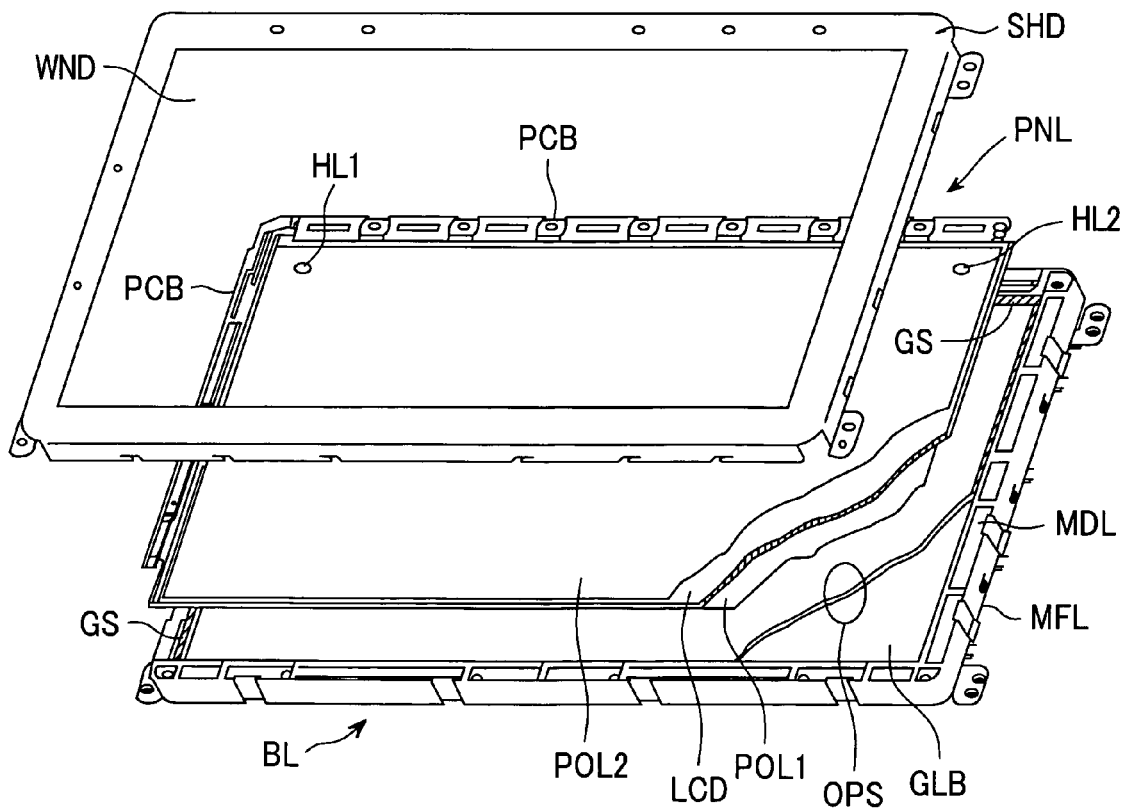
FIG. 6 is a developed perspective view of an essential part showing the constitution of a LCD device.
Figure 7A:
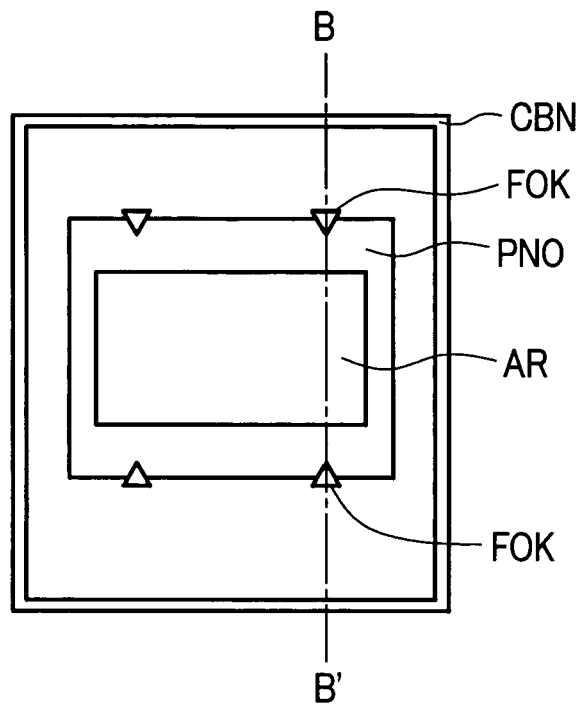
Figure 7B:
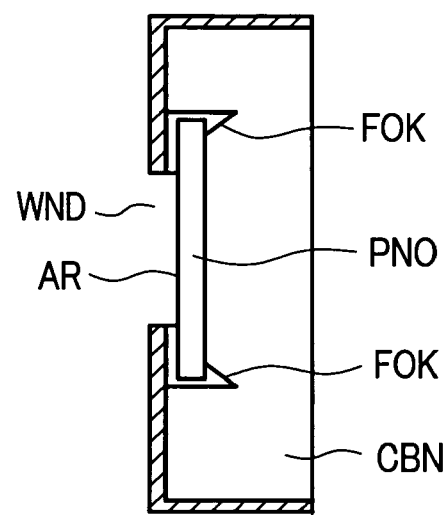

FIG. 3A and FIG. 3B specifically show the mounting structure which mounts and fixes the OLED panel PNO to the casing CBT, wherein FIG. 3A is a plan view of an essential part as viewed from a back surface side and FIG. 3B is a cross-sectional view taken along a line B-B' in FIG. 3A. Parts identical with the parts shown in the above-mentioned FIG. 6 are given the same symbols and the explanation of these parts is omitted. As shown in FIG. 3, with respect to a casing CBN of a television receiver set, for example, while aligning an effective display region AR of the OLED panel PNO with an opening window WND of the casing CBN, fixing jigs JIG1, JIG2 such as thumbtacks or hooks, for example, are respectively inserted into a pair of mounting holes HL1, HL2 which constitute the reference, and the OLED panel PNO is directly fixed to the casing CBT. In this manner, the mounting which uses the display region AR as the mounting reference becomes possible and hence, the accuracy of the mounting position of the OLED panel PNO is largely enhanced whereby the OLED panel PNO can be positioned with high accuracy.

Further, by bringing the hooks FOK into contact with the notched portions CT1, CT2 formed in the lower end portion which face the pair of mounting holes HL1, HL2 formed in the upper end portion of the OLED panel PNO in an opposed manner, it is possible to support the OLED panel PNO at a plurality of points and hence, the mounting accuracy can be further enhanced. Accordingly, the OLED panel PNO can be mounted and fixed to the casing CBT with higher accuracy.

Figure 4:
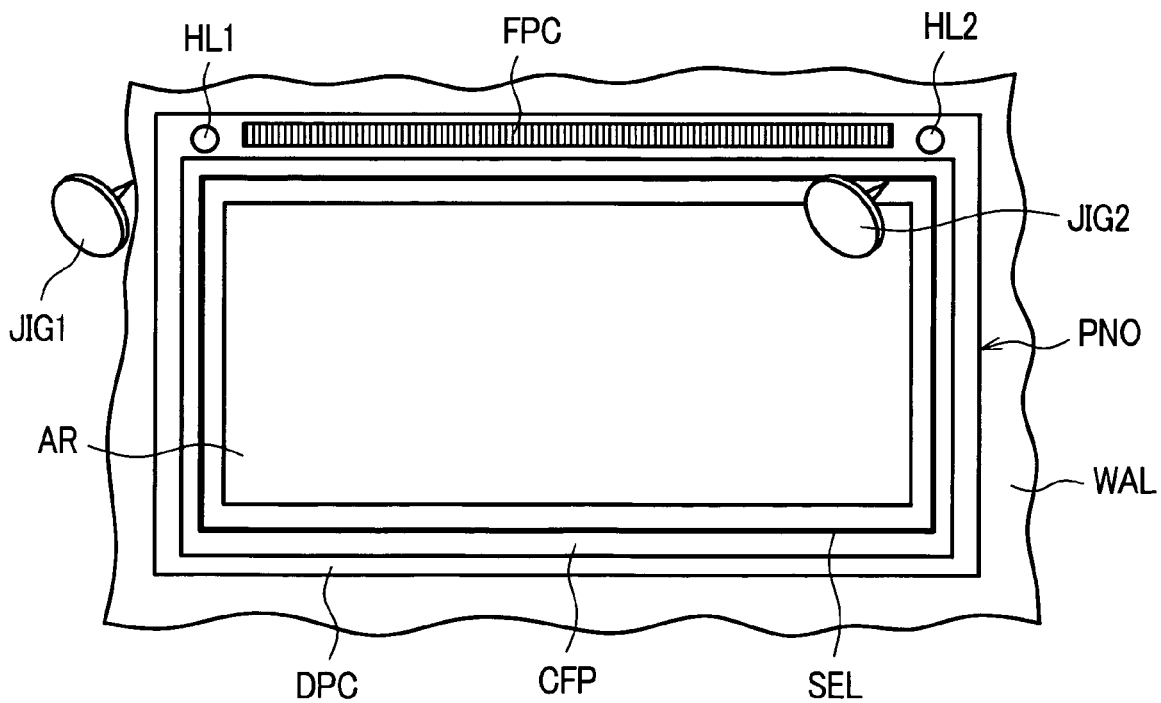
FIG. 4 is a plan view of an essential part for explaining one example of the structure for mounting the OLED device on other fixing member.

FIG. 4 is a plan view of an essential part for explaining one example of the structure which mounts the OLED panel PNO on other fixing member. As shown in FIG. 4, by allowing fixing jigs JIG1, JIG2 such as thumbtacks or hooks, for example, to be inserted into the pair of mounting holes HL1, HL2 formed on an upper end portion of the OLED panel PNO, it is possible to directly fix and arrange the OLED panel PNO on a member WAL to be fixed such as a pillar or a wall surface, for example.

Figure 5A:
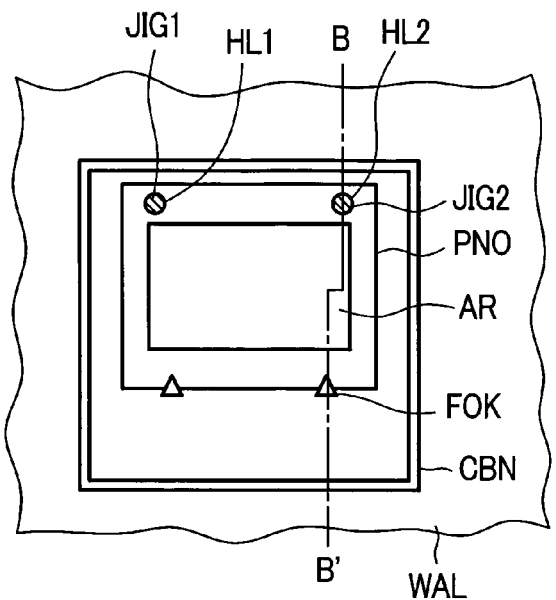
Figure 5B:
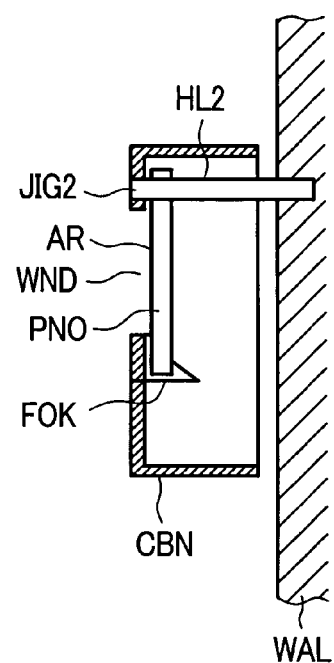

FIG. 5A and FIG. 5B are views for explaining another example of the mounting structure which mounts and fixes the OLED panel to other fixing member, wherein FIG. 5A is a plan view of an essential part and FIG. 5B is a cross-sectional view taken along a line B-B' in FIG. 5A. As shown in FIG. 5A and FIG. 5B, by allowing fixing jigs JIG1, JIG2 such as thumbtacks or hooks, for example, to be inserted into a pair of mounting holes HL1, HL2 formed in an upper end portion of the OLED panel PNO, it is possible to mount and fix the OLED panel PNO and the casing CBN together and, at the same time, it is possible to fix and arrange the OLED panel PNO to the fixing member WAL such as a pillar or a wall surface, for example, for every casing CBN.

Here, in the above-mentioned embodiment, the explanation has been made with respect to the case in which, in the lower end portion which faces the pair of mounting holes HL1, HL2 which are formed in the upper end portion of the OLED panel PNO, two notched portions CT1, CT2 are formed. However, even when one notched portion is formed in a center portion of the lower end portion and the OLED panel PNO is supported by bringing the hook FOK into contact with the notched portion, it is possible to enhance the mounting accuracy.

In the above-mentioned embodiment 1, the explanation is made with respect to the case in which the OLED device (the OLED panel) is used as the display device. However, the present invention is applicable to the LCD device in place of the OLED device.

Embodiment 2

FIG. 6 is a developed perspective view of an essential part for explaining the constitution of an LCD device. In FIG. 6, in the LCD panel PNL, a liquid crystal layer is formed between a first substrate and a second substrate in a sandwiched manner, and on an inner surface of both or either one of the first substrate and the second substrate formed of a light transmitting glass plate, electrodes for forming pixels, active elements and the like are mounted. Here, the first substrate on which the active elements such as thin film transistors (TFT) and the like are formed is also referred to as an active matrix substrate, while the first substrate which uses thin film transistors is also referred to as a TFT substrate.

The LCD panel PNL mounts drive circuits and the like in the periphery (an upper side and a left side in this embodiment) of an LC cell, while the LCD panel PNL also includes a printed circuit board PCB which supplies signals to these drive circuits. Further, in the LCD panel PNL, in sparse regions which are arranged at both end portions of an upper end side of an effective display region AR and where wiring, a pixel forming region and the like are not present, a pair of mounting holes HL1, HL2 which have the constitution identical with the above-mentioned constitution of the mounting holes HL1, HL2 in conjunction with the embodiment 1 are formed as reference holes for mounting and fixing the LCD panel PNL to the casing. Further, on front and back surfaces of the LCD panel, polarizers POL1, POL2 are respectively stacked.

Further, with respect to the LCD panel PNL, in a state that the effective display region AR of the LCD panel PNL is aligned with an opening window WND of an upper frame SHD which constitutes a casing for covering the LCD panel PNL from above, using the pair of mounting holes HL1, HL2 as the reference, fixing jigs such as thumbtacks or hooks, for example, not shown in the drawing are inserted into the mounting holes HL1, HL2 from a back-surface side thereof respectively and hence, the LCD panel PNL is directly fixed to the back surface of the upper frame SHD whereby it is possible to mount and fix the LCD panel PNL which uses the display region AR as the mounting reference with high accuracy.

A backlight unit BL which is arranged on a back surface of the LCD panel PNL includes a light guide plate GLB, a light emitting diode substrate on which light emitting diodes are mounted, and a mold frame MDL in which a light reflection plate and the like are accommodated, wherein the LCD panel PNL is supported on the mold frame MDL. Further, an optical compensation sheet stacked body OPS which is constituted of two sets of prism sheets and diffusion sheets is placed above the light guide plate GLB.

In this constitutional example, the backlight unit BL is mounted on a shape elastic member GS which is arranged in an inner peripheral portion of the mold frame MDL. The LCD panel PNL which is fixed to the upper frame SHD using the above-mentioned fixing jigs is mounted by way of the shape elastic member GS, wherein by combining the upper frame SHD and the lower frame MFL, the backlight unit BL and the LCD panel PNL are integrally formed in a state that an opening window WND of the upper frame SHD and the effective display region AR of the LCD panel PNL are aligned with each other.

Due to such a constitution, the LCD panel PNL can use the pair of mounting holes HL1, HL2 formed on both end portions at the upper end side as positioning references and hence, it is possible to easily perform the positioning of the LCD panel PNL with high accuracy. Further, it is unnecessary to carry out the assembling forming for mounting the upper frame SHD on the backlight unit BL and hence, it is extremely easy to perform the narrowing of the picture frame. Further, since extra mechanism for such mounting becomes unnecessary, the structure and the assembling steps can be simplified thus lowering a manufacturing cost. Accordingly, the drawbacks of the currently adopted mounting structure of the upper frame SHD and the LCD panel PNL which uses the backlight unit BL as the positioning reference can be totally solved.

What is claimed is:

1. A display device comprising:
    a display panel which includes an effective display region for performing an image display, said display panel comprising a substrate, the substrate including a thin film transistor and holes, each of the holes being bored through said substrate and arranged outside of said effective display region;
    a casing which includes an opening window which exposes the effective display region of the display panel and accommodates the display panel in a state that the effective display region is exposed through the opening window; and
    fixing members, each of which is allowed to pass through a corresponding hole among the holes formed in the substrate and fixedly arranges the substrate on the casing.

2. A display device according to claim 1, wherein said substrate comprises at least one notched portion.

3. A display apparatus comprising:
    an OLED panel which includes an effective display region for performing an image display;
    said display panel comprising a substrate, the substrate including a thin film transistor, an organic EL layer and holes, the holes being bored through said substrate and arranged outside of said effective display region;
    a casing which includes an opening window which exposes the effective display region of the substrate and accommodates the OLED panel in a state that the effective display region is exposed through the opening window; and
    fixing members, each of which is allowed to pass through a corresponding hole among the holes formed in the substrate and fixedly arranges the substrate on the casing.

4. A display apparatus according to claim 3, wherein in another side of the OLED panel which faces one side of the OLED panel in an opposed manner, at least one notched portion which supports the OLED panel is formed.

* * * * *